United States Patent [19]
Bonham et al.

[11] Patent Number: 6,157,959
[45] Date of Patent: Dec. 5, 2000

[54] METHOD AND APPARATUS FOR PROVIDING PORTABLE KERNEL-MODE SUPPORT FOR FAST INTERPROCESS COMMUNICATION

[75] Inventors: Peter Bonham; Ulrich Klein; Harri Mauria, all of Friedrichsdorf, Germany

[73] Assignee: Tandem Computers, Incorporated, Cupertino, Calif.

[21] Appl. No.: 08/887,758

[22] Filed: Jul. 3, 1997

[51] Int. Cl.[7] ............................ G06F 13/00; G06F 15/163
[52] U.S. Cl. ............................ 709/300; 709/303; 709/304
[58] Field of Search ................................ 395/712, 527; 709/1, 100, 201, 203, 217, 218, 219, 226, 250, 300, 301, 303, 304, 230, 236, 237, 302

[56] References Cited

U.S. PATENT DOCUMENTS

| | | | |
|---|---|---|---|
| 5,307,490 | 4/1994 | Davidson et al. | 395/684 |
| 5,339,422 | 8/1994 | Brender et al. | 395/704 |
| 5,485,579 | 1/1996 | Hitz et al. | 709/221 |
| 5,537,417 | 7/1996 | Sharma et al. | 709/228 |
| 5,577,251 | 11/1996 | Hamilton et al. | 395/671 |
| 5,682,534 | 10/1997 | Kapoor et al. | 395/684 |
| 5,771,383 | 6/1998 | Magee et al. | 395/680 |

*Primary Examiner*—Viet D. Vu
*Attorney, Agent, or Firm*—Wilson Sonsini Goodrich & Rosati

[57] ABSTRACT

A method and apparatus for providing kernel mode support for fast IPC between a client process and a server process. A client application accesses a kernel mode of an operating system via a device driver or similar method. The client creates an abstract "resource" data type and derives a client port therefrom. The client port references a call structure containing object call data. The call is transported via a transport agent to the server. The server accesses the kernel mode of the operating system and creates a resource data type and a server port derived from the resource type. The server awaits calls from the clients using the server port. When a call arrives, the server port extracts the data from the call structure and performs the requested service. The server port then transmits a response back to the client. The use of the abstract resource data type permits portability across different operating systems and platforms.

11 Claims, 11 Drawing Sheets

METHOD AND APPARATUS FOR PROVIDING PORTABLE KERNEL-MODE SUPPORT FOR FAST INTERPROCESS COMMUNICATION

BACKGROUND OF THE INVENTION

1. Field of the Invention

The present invention relates to a method and apparatus for performing fast interprocess communication in the kernel mode of an operating system. Specifically, the method involves implementing common data structures as an abstract data type termed a "resource." The resource is a general mechanism for kernel mode resource allocation, deallocation, and signaling. Data structures derived from the resource data type may be used by participants to facilitate object calls across heterogeneous systems.

2. Background

Distributed object computing combines the concepts of distributed computing and object-oriented computing. Distributed computing involves two or more pieces of software sharing information with each other. These two pieces of software could be running on the same computer or across different computers connected via a network connection. Most distributed computing is based on a client/server model. With the client/server model, two major types of software are used: client software, which requests information or a service, and server software, which provides the information or service.

Object-oriented computing is based upon the object model of computer programming where pieces of code termed "objects" own data (termed "attributes") and provide services to other objects through methods (also known as "operations" or "member functions"). The data and methods contained in an object may be "public" or "private". Public data may be altered by any other object. Most data, however, is private and accessible only to methods owned by the object. Typically, the object's methods operate on the private data contained within the object.

A collection of similar objects makes up an interface. An interface specifies the methods and types of data contained in all objects of the interface. Objects are then created ("instantiated") based upon that interface. Each object contains data specific to that object. Each specific object is identified within a distributed object system by a unique identifier called an object reference. In a distributed object system, a client sends a request (or "object call") containing an indication of the operation for the server to perform, the object reference, and a mechanism to return "exception information" (unexpected occurrences) about the success or failure of a request. The server receives the request and, if possible, carries out the request and returns the appropriate exception information. An object request broker ("ORB") or similar intermediary provides a communication hub for all objects in the system passing the request to the server and returning the reply to the client. Object calls may be implemented across systems ("intercpu calls") or across processes within a single system ("interprocess calls").

The ability to perform fast intercpu or interprocess calls (collectively, "cross-domain object calls") is a necessary foundation for any commercially viable distributed object system. To provide fast cross-domain object calls, a distributed object system must operate in the kernel mode of the operating system. Operating systems typically have two modes: user mode and kernel mode. The distinction between the two modes involves memory addressing and instruction levels. In user mode, each process operates in a separate memory address without the ability to disturb the address of other processes. In kernel mode, no addressing restrictions are placed upon processes. To perform fast cross-domain calls, the operating system must operate in the kernel mode. Kernel mode operation ensures the availability of certain resources that would otherwise not be available to perform object calls. Moreover, purchasers of the distributed object system are assured that the integrity of the overall mechanism has the same integrity as the operating system.

Interprocess communication is typically performed in kernel mode between processes executing on separate machines, although the processes may execute within the same machine. In a classical object call, a first process (a "client process") requiring a specific service attempts to call an object within a second process (a "server process"). The server process usually is allocated a process control block by the operating system. The process control block has a message queue for receiving messages from other processes. Once a call is made by the client process, the call is queued onto the message queue. A low-level routine (such as an "awake" or "signal" routine) within the operating system "wakes up" the server process. The server process can then properly implement the call. Finally, the file system dequeues the message.

The classical approach to interprocess communication has certain drawbacks. First, users of the system are forced to use a particular transport layer. Iona's Orbix, for example, uses TCP/IP as its transport layer. Thus, cross-domain calls are performed using the TCP stack. This requirement is disadvantageous since many real-world application scenarios are thereby precluded. In addition, this requirement may be costly since users who do not use a particular transport are forced to purchase that transport layer. Second, implementations are usually tied to a particular operating system. This operating system-dependency arises from the fact that the kernel mode on each OS is different. Accessing the kernel mode in Windows NT, for instance, is very different from accessing the kernel mode in UNIX. Rather than provide kernel mode support for several operating systems, interprocess communication is usually tightly coupled to one operating system. Thus, users are forced to use a single operating system throughout their network. In many instances, such single operating system networks are not viable.

Accordingly, a need exists for kernel mode support of fast interprocess communication.

Moreover, a need exists for such kernel mode support to operate independently of transport layers and operating systems.

SUMMARY OF THE INVENTION

The present invention satisfies the need for kernel mode support of fast interprocess communication. Further, the present invention satisfies the need for such support to operate independently of transport layers and operating systems. The present invention is directed to a method and apparatus for performing an interprocess object call between a client process residing in a memory of a client computer and a server process residing in a memory of a server computer. The method accesses the kernel mode of a client operating system residing in the client computer. The kernel mode may be accessed in several ways, including through the use of a character device driver or through system generated functions. In the kernel mode, an abstract data type, termed a "resource" is created. Next, a client port derived from the resource data type is created. The client port references a call structure that will be transported to the server computer to specify the parameters for a requested service. On the server side, the kernel mode of the server computer is accessed via a device driver or similar method. A server port, derived from an abstract resource data type on the server computer, is created for accessing the data stored in the call structure. The server may then perform the specified service and respond to the client.

In a second embodiment of the present invention, the transfer of large amounts of data (e.g., video data) is facilitated through different functionality. More specifically, the client accesses the kernel mode of the client computer and creates a client media port. The client executes a loop to continuously send a message to a server port requesting the data. The message is in the form of a datagram (an unreliable communication) and contains a port identifier. Similarly, the server executes a loop to receive the data. Rather than streaming data through a transport agent, data can be transported immediately based upon the port identifier.

A more complete understanding of the method and apparatus for kernel mode support of fast IPC will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Reference will now be made in detail to the preferred embodiments of the invention, examples of which are illustrated in the accompanying drawings. Wherever possible, the same reference numbers will be used throughout the drawings to refer to the same or like parts.

I. Hardware Overview

Figure 1:
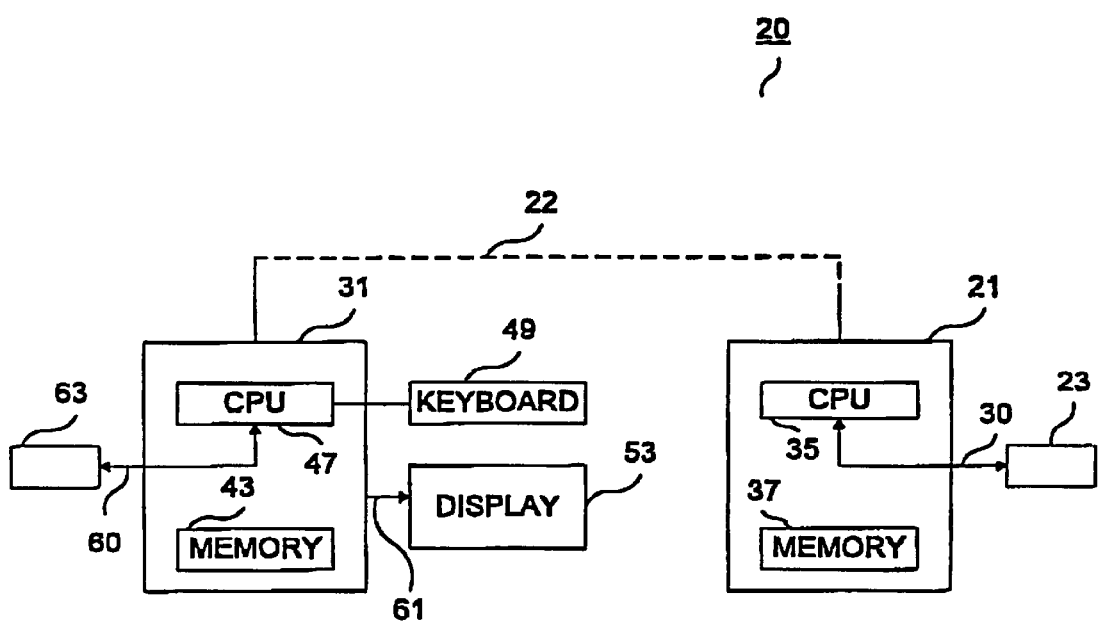
FIG. 1 illustrates a sample client/server system using the method of the present invention.

As illustrated in FIG. 1, the present invention is designed for use in a distributed (client/server) computing environment 20. A client system 21 and a server system 31 are connected by network connections 22, such as internet connections or the connections of a local area network or wide area network. The server computer 21 communicates over a bus or I/O channel 30 with an associated storage subsystem 23. The server system 21 includes a CPU 35 and a memory 37 for storing current state information about program execution. A portion of the memory 37 is dedicated to storing the states and variables associated with each function of the program which is currently executing on the server computer. The client computer 31 similarly includes a CPU 47 and associated memory 43, and an input device 49, such as a keyboard or a mouse and a display device 53, such as a video display terminal ("VDT"). The client CPU 47 communicates over a bus or I/O channel 60 with a disk storage subsystem 63 and via I/O channel 61 with the keyboard 49 and mouse. Both computers are capable of reading various types of media, including floppy disks and CD-ROMs. The client/server model as shown in FIG. 1 is merely demonstrative of a typical client/server system. Within the context of the present invention, the "client" is an application requesting a service (or calling an object), while the "server" is an application that implements the requested service (or contains the called object). Indeed, both the client and server applications may reside on the same computer. The client and server applications may also reside on separate computers using different operating systems.

To facilitate call transfer, the present invention identifies each client or server machine 31, 21, in a network 20 by a unique site ID. A site ID is a data structure composed of two 32-bit integers. The first integer is a manufacturer ID assigned by a global authority, such as the software engineering company. The second integer is a machine ID which identifies the node on the network. The machine ID is assigned by the manufacturer of the machine. The site ID is used to identify specific sites within the networked environment 20.

II. The Object Core Library

The present invention is directed to a group of callable interface functions, termed the Object Core Library ("OCL"), for facilitating interprocess communication between a client application and a server application residing on separate machines 31, 21 ("inter-site") or within the same machine ("intra-site"). Moreover, the OCL functions may be used to perform interprocess communication ("IPC") calls between systems using different operating systems and platforms ("heterogeneous systems"). The functions are called from a client or server application in the user mode of the operating system. All functions are performed by the OCL, however, within the kernel mode of each operating system, using the logical method for accessing the kernel on that operating system.

Figure 2A:
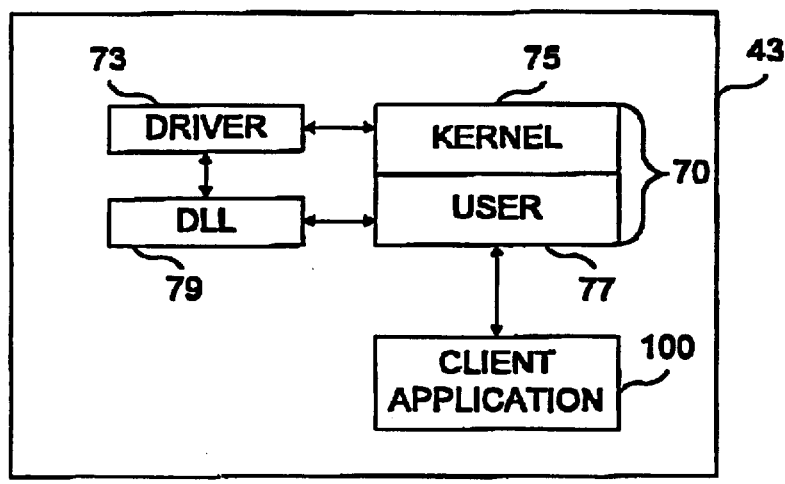
FIG. 2A illustrates the implementation of the present invention on a Windows NT platform.
Figure 2B:
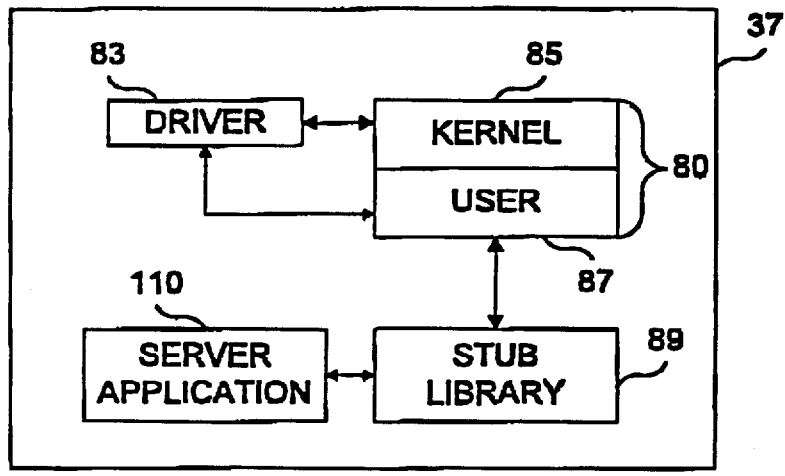
FIG. 2B is a block diagram illustrating the implementation of the present invention on a UNIX platform.
Figure 2C:
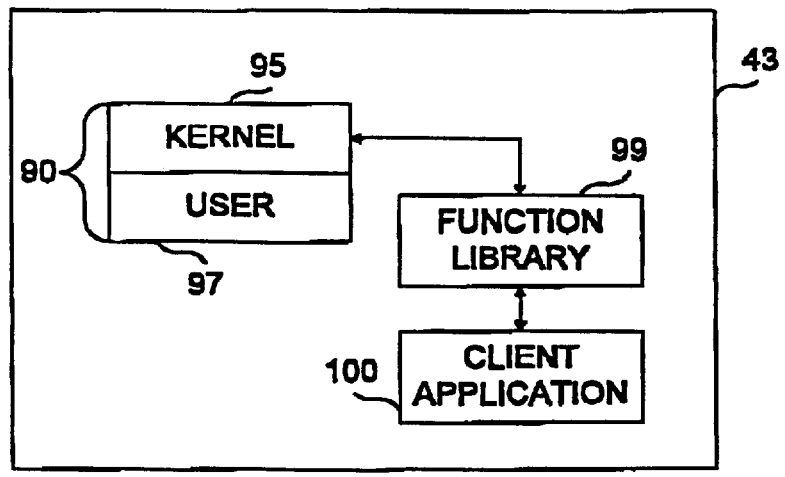
FIG. 2C is a block diagram illustrating the implementation of the present invention on a Tandem NSK platform.

FIGS. 2A–2C illustrate how the present invention may be implemented to access the kernel mode of different operating systems. As shown in FIG. 2A, if the operating system 70 resident in client memory 43 is Windows NT, the present invention may be implemented as a device driver 73 linked into the NT kernel 75 along with a user mode stub dynamic link library ("DLL") 79 that allows a client application 100 to call the OCL functions. (Windows NT is a trademark of Microsoft Corp.) On a server system implementing the UNIX operating system, as shown in FIG. 2B, the present invention may be implemented as a device driver 83 that is linked or loaded into the UNIX kernel 85 and a user mode stub library 89 that must be linked with the server application 110. (UNIX is a trademark of Novell Corp.) The user mode library 89 converts the OCL functions into a call to the driver 83. FIG. 2C illustrates implementation in a Tandem NSK environment. (NSK is a trademark of Tandem Computers Inc.) In the NSK environment, the OCL may be implemented as a function library 99 containing a set of callable functions which are system generated ("sysgenned") into the kernel 95.

While shown residing in memory, it should be apparent that computer instructions embodying a method of the present invention may be embodied in machine readable media. It will also be understood that the invention may be implemented using any appropriate techniques for implementing the functionality described herein. The described embodiment is written in the C programming language and is designed to run under UNIX, Windows NT, and Tandem NSK operating systems, but the invention is not limited to any particular programming language or operating system.

Figure 3:
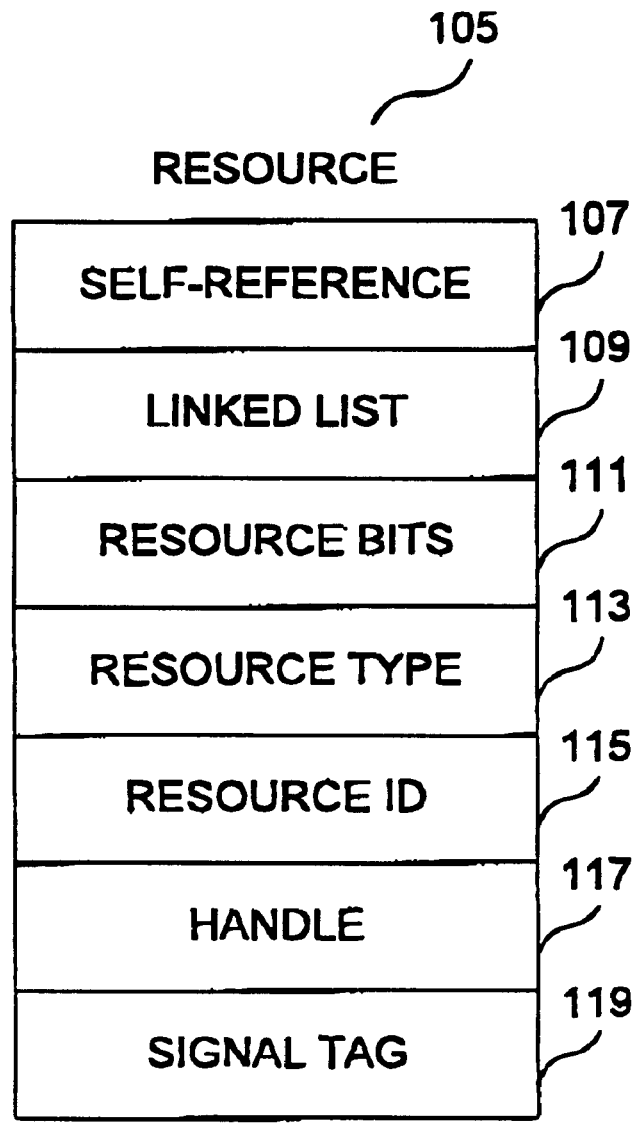
FIG. 3 is an illustration of a resource data structure.

OCL functionality is prefaced upon the notion of a "Resource". A Resource is an abstract data type implemented by the OCL functions. The resource will be implemented differently within different operating systems. Nevertheless, a resource must provide the minimal functionality described below. FIG. 3 illustrates the abstract resource data structure 105. The structure 105 includes a self-reference pointer 107 to itself. A linked list 109 permits the linking of various resource data structures. The resource bits parameter 111 includes the bit pattern of the structure. The resource type parameter 113 indicates the resource type of the data structure (e.g., capsule, client port, etc.). The resource ID 115 is the resource identifier for the resource (discussed below). Each resource includes a handle 117 is returned to the application allowing the resource to be called and re-called by functions. The signal tag is used by the application to facilitate an asynchronous operation (described below).

Figure 4:
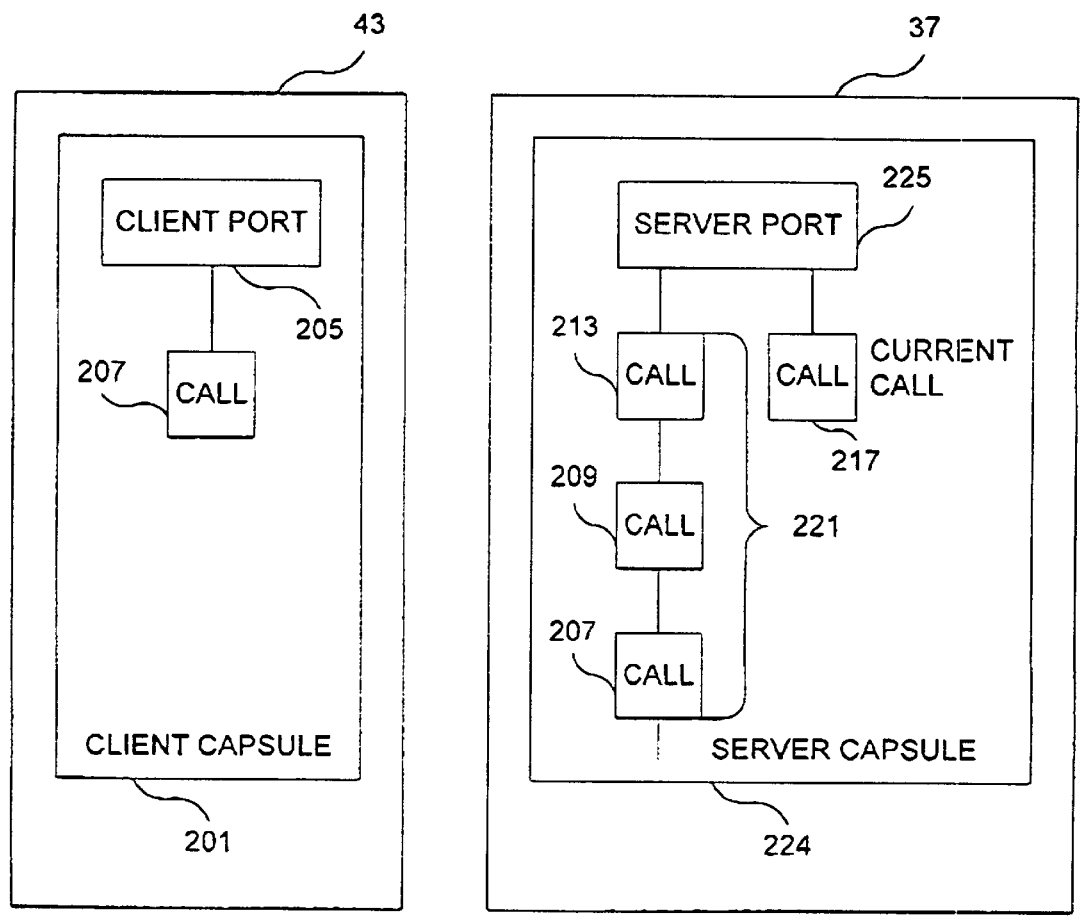
FIG. 4 illustrates client ports, server ports, and calls.

The OCL uses four data structures derived or "inherited" from the abstract Resource data type to perform fast IPC: (1) a capsule; (2) a client port; (3) a server port; and (4) a server port queue. FIG. 4 illustrates the relationship between capsules, client ports and server ports. A capsule 201 is a memory-resident process or similar unit of execution that contains other resources (since an application usually resides in a single capsule, hereinafter capsule and application will be used interchangeably). A client port 205 is a resource that is used to send a request/call from a client-side capsule 201. Each client port is associated with one call data structure 207. Thus, on one client port 205, only one call 207 may be active at any given time. When a client capsule 201 initiates a call on the client port 205, the call data structure 207 is filled with the necessary information about the request, including any necessary parameters and exception information. The call 207 is then queued to the call queue 221 of a server port 225 via a transport agent, such as the User Datagram Protocol ("UDP").

On the server side, a server port resource 225 is used to receive a call. Each server port 225 is associated with a call queue 221 and one current call 217. The server capsule 224 must first respond to the current call 217 prior to receiving another call. Thus, the server capsule 221 can only act upon a single call. Once the server capsule 221 has responded to the call through an OCL function, the response and its associated data are sent back to the client port 205. The client port is then signaled and the client capsule 201 retrieves the result. The call data structure may then be used for a subsequent request or destroyed.

Figure 5:
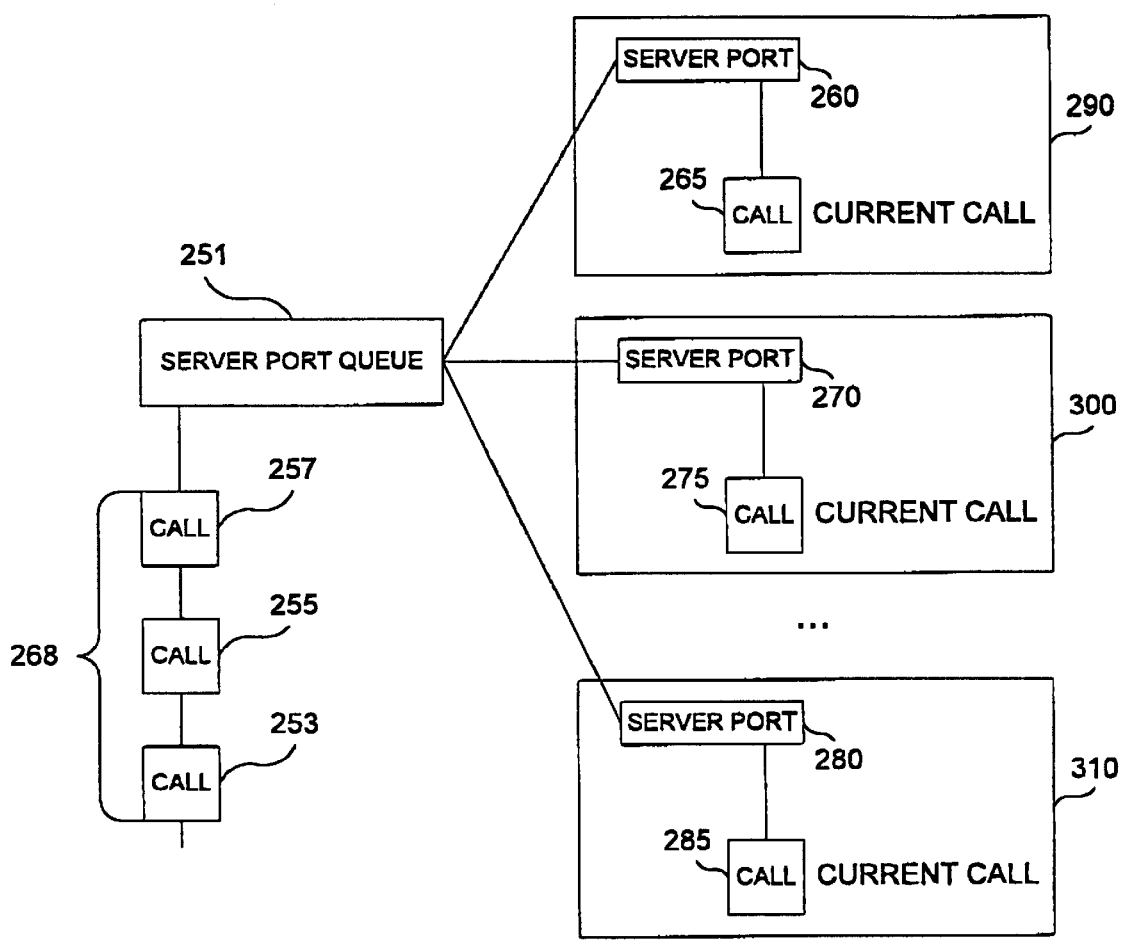
FIG. 5 illustrates client ports, server ports, server port queues and calls.

FIG. 5 illustrates the use of a server port queue 251. A server port queue 251 is a server-side resource that allows multiple server ports 260, 270, 280 in separate capsules 290, 300, 310, or in the same capsule, to receive calls sent to a single server port "address." As described below, server ports 260, 270, 280 attach themselves to a server port queue 251 using an OCL function call. Once attached, the specific server port is not visible to the client port. Instead, calls 253, 255, 257 queued on the call queue 268 of the server port queue 251 are dispatched to attached server ports. Client capsules are never aware of whether they are sending calls to a server port or a server port queue.

Internally, the OCL identifies resources using a Universally Unique Resource Identifier ("UURID") 115. When a resource (e.g., a client port) is created, the OCL creates a UURID for the resource. At the resource's death, the UURID becomes invalid and may no longer be used. UURIDs are invisible to capsules. Instead, an application identifies and references a resource using a Native Object Reference ("NOR"). A NOR must be "bound" to a server port or a server port queue to make the server port accessible to a client. A client port must "set" a NOR prior to initiating calls in order to determine the target server port. From the client or server application's perspective, a NOR is an opaque structure composed or decomposed via calls to the OCL. When a call is initiated by a client application, the OCL resolves the NOR set by the client port into its underlying UURID prior to performing the call. Once the NOR has been resolved into a UURID, the OCL reuses the UURID for calls from the same client port if no new NOR has been set. When a UURID becomes invalid, the OCL must re-resolve the NOR.

Two types of NORs may be used by applications: (1) dynamic NORs ("DNORs"); and (2) site NORs ("SNORs"). A dynamic NOR implicitly includes the UURID of a resource. Thus, a DNOR may only be used to reference one instance of a resource. When a server port is created, the OCL implicitly binds a DNOR to the port such that requests may immediately be sent to that port. Client ports, however, must explicitly set the DNOR prior to initiating a call. Moreover, since DNORs lack an additional naming feature, the DNOR must be transmitted to the client capsule using external means.

SNORs permit a more flexible naming scheme for NORs. An SNOR contains the site ID identifying the node on the network 20 where the resource resides, an object manufacturer ID identifying the manufacturer of the object supplying the server port (not to be confused with the manufacturer ID contained within the site ID), and an object ID assigned by the client or server application. Unlike DNORs, SNORs may be reused for other ports if they are first unbound from a previous port. Therefore, SNORs may be used to identify a specific service available on a specific site.

Each resource is further defined by a group of associated attributes. An attribute may be set or retrieved at any time by an application. Client ports have three associated attributes: (1) a signal tag attribute; (2) a signal information attribute; and (3) a native object reference attribute. The signal tab attribute is used by the application to facilitate an asynchronous operation (described below). The signal information attribute is a read-only attribute that indicates the return status of an outstanding call and the number of response bytes received. This attribute, too, is useful when performing an asynchronous operation. As discussed above, the NOR attribute is set prior to initiating the first call. The NOR indicates the name of a service to which requests should be sent.

A server port has the following attributes: (1) a signal tag attribute; (2) a signal information attribute; (3) a signal cancel attribute; (4) a native object reference (NOR)

attribute; and (5) a bound native object reference attribute. The signal tag and signal information attributes are used for asynchronous operation. The signal cancel attribute is modified to change the behavior of the server port for canceled client calls. When the attribute is false, the server port will not be signaled when a client call is canceled. When the attribute is true, the server port will be signaled if a call is canceled. The NOR attribute is an implicit NOR bound to the server port at the time the server port is created. A server port may explicitly be bound to an NOR using the bound NOR attribute.

Figure 6A:
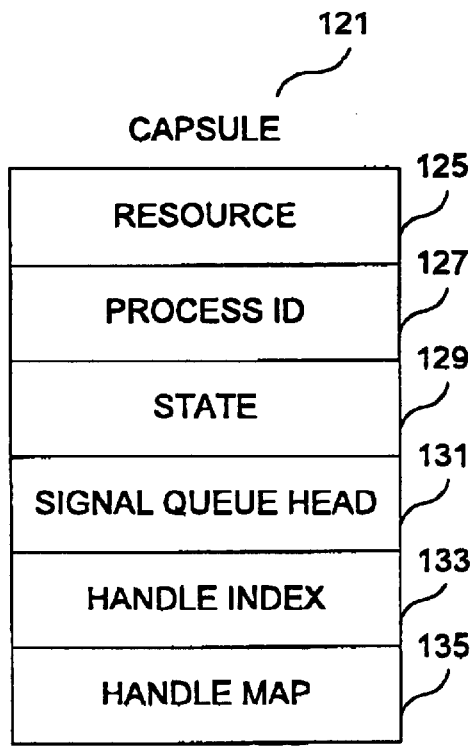
FIG. 6A is an illustration of a capsule data structure.

Each data structure derived from the abstract resource structure will now be described with reference to FIGS. 6A–6E. FIG. 6A illustrates a capsule data structure 121. The structure 121 includes a resource header 125 as the first parameter. Each derived data structure includes the resource header, to achieve the inheritance described above. A process identifier 127 identifies the process corresponding to the data structure. The state 129 parameter is used to store state information about the capsule. The signal queue head field 131 is used as part of a linked list of server port queues. The handle map index 131 stores indices in a list of associated handles for the capsule. The handle map field 135 holds a list of resource handles associated with the capsule.

Figure 6B:
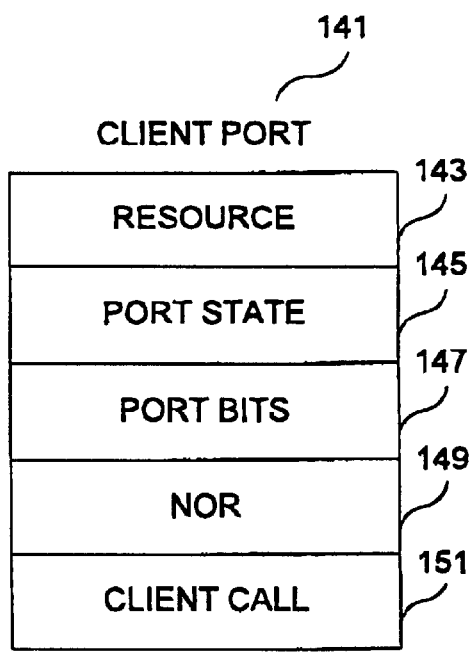
FIG. 6B is an illustration of a client port data structure.

FIG. 6B illustrates a client port data structure 141. The data structure 141 includes a resource header 143, thus allowing the structure to inherit the parameters of the abstract resource data type, as discussed above. The port state field 145 is used to store state information about the client port. The port bits 147 field stores the bit pattern for the client port data structure 141. The NOR field 149, as stated above is set prior to initiating the first call. It may be a DNOR or an SNOR. The client call field 151 contains a pointer to the call structure associated with the client port.

Figures 6C, 6D:
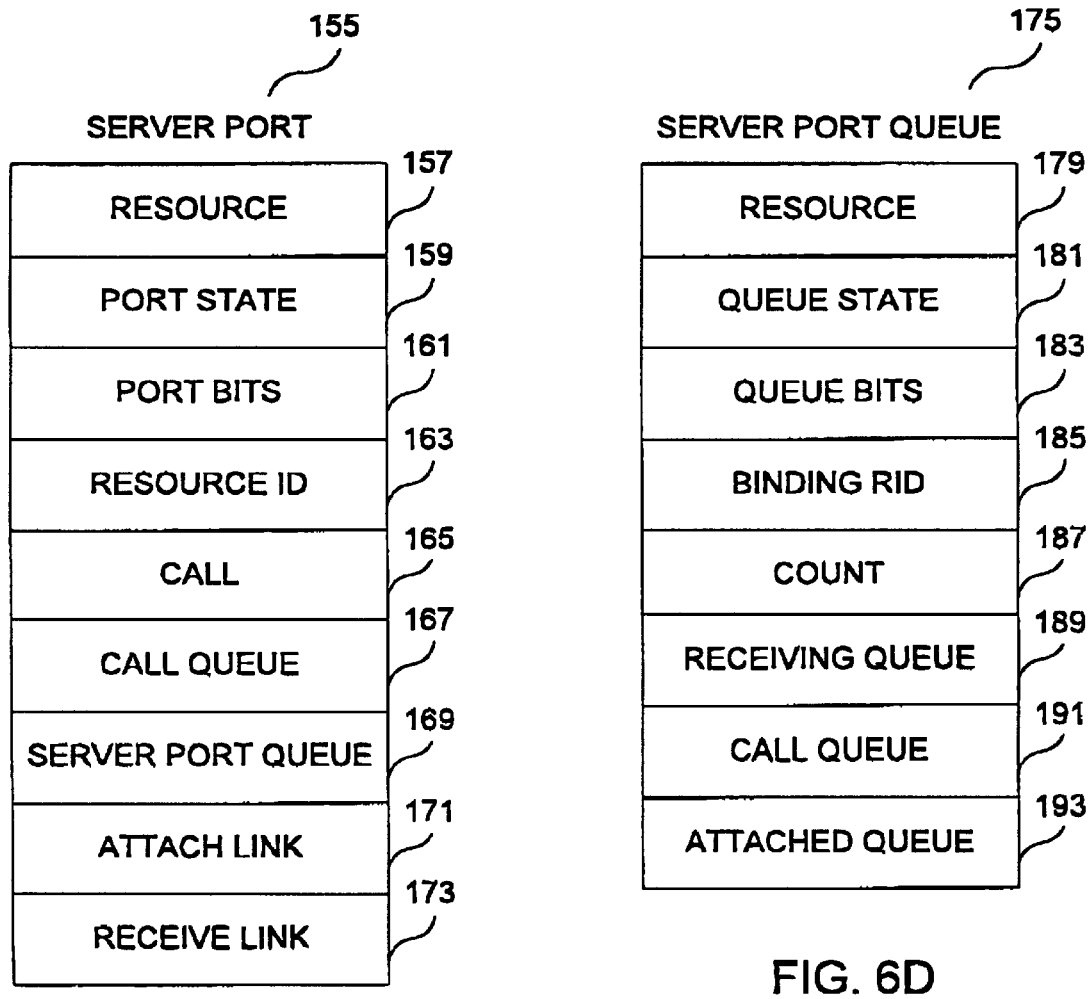
FIG. 6C is an illustration of a server port data structure.
FIG. 6D is an illustration of a server port queue data structure.

FIG. 6C illustrates a server port data structure 155. The structure 155 includes a resource header 157. The port state field 159 stores state information about the server port. The server port bits field 161 stores the bit pattern for the server port data structure. The resource ID field 163 contains the resource identifier for the server port. The call associated with the server port is referenced by the call field 165. The call queue (if any) associated with the server port is referenced by the server port queue 167. If the server port is part of a server port queue, the queue is referenced by the server port queue field 169. A linked list of server ports are maintained using the attach link field 171 and receive link field 173.

FIG. 6D illustrates a server port queue data structure 175. The server port queue 175 includes the resource header 179. The queue state field 181 stores state information for the server port queue. The bit pattern for the data structure is stored in the queue bits field 185. The binding RID field 185 holds an RID associated with the server port queue 175. The count field 187 keeps a count of attached server ports. The receiving queue field 89 stores a reference to the attached server ports. The call queue field 191 refers to the calls received on the server port queue. The attached queue field 193 facilitates a linked list of server port queues.

Figure 7:
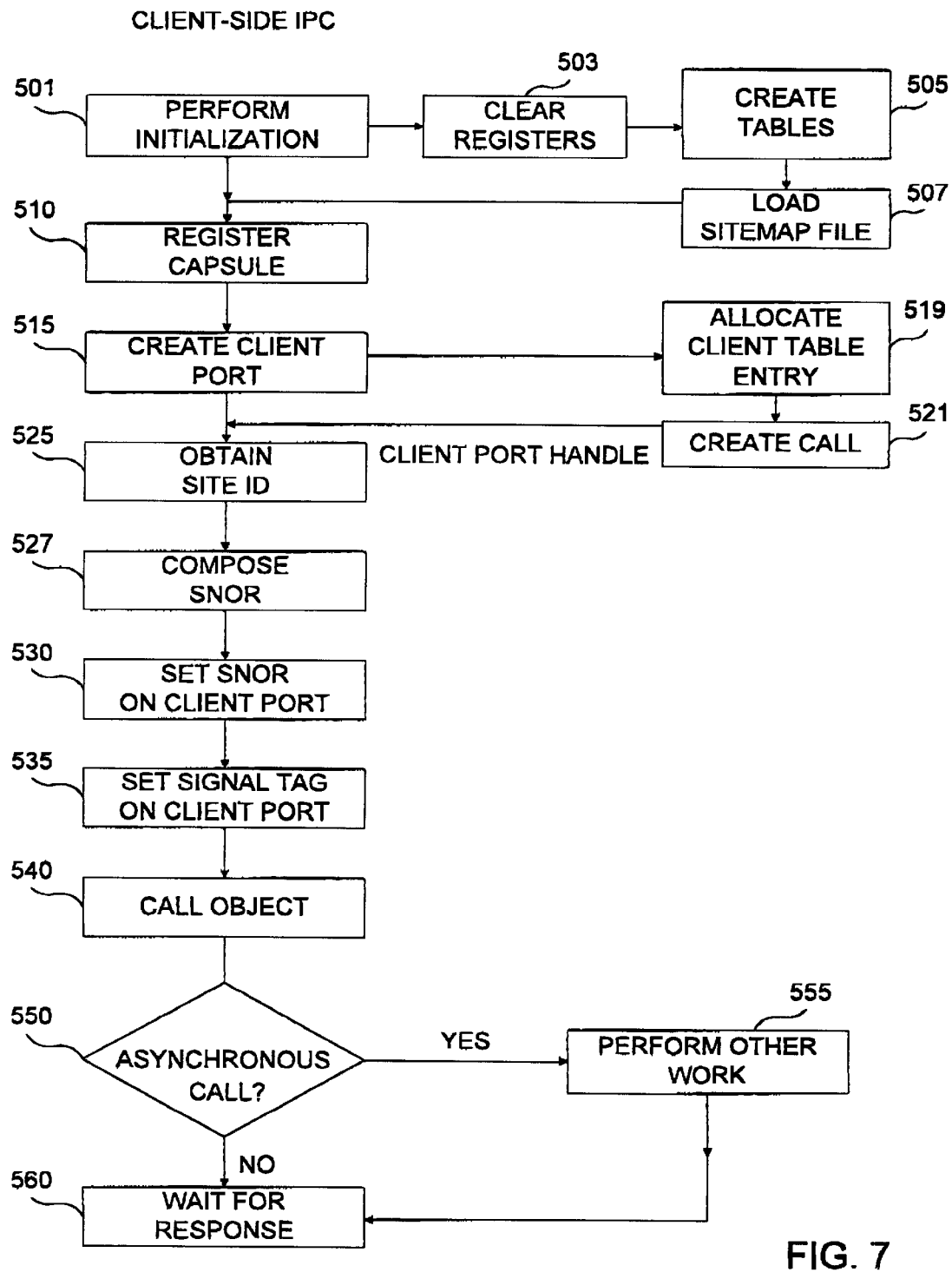
FIG. 7 is a flow chart illustrating the client side of a cross-domain object call using a preferred embodiment of the present invention.

FIG. 7 is a flow chart illustrating the client-side of a cross-domain object call using the OCL functions of the present invention. These functions are called by a client application running within a capsule on the client computer 31. On both the client and the server computers, the OCL is first loaded into the respective memories 43, 37. As stated above, the OCL is implemented differently on systems using different operating systems. On Windows NT, the OCL is implemented as a device driver together with a user mode stub dynamic link library that allows a user program to call the OCL functions. On a UNIX system, a character device driver is loaded into memory. In either case, these functions are called from within an application running in user mode. Each OCL function call places its parameters and return codes into a data structure and accesses the kernel (via a driver, system calls, etc.) These functions are then implemented within the kernel mode of the operating system.

At system start-up or when the OCL is loaded, it must perform certain initialization routines. An administrative process, termed the Object Core Agent ("OCA"), begins by clearing local registers and allocating memory within the computer for the resource in step 503. In step 505, a capsule table is created in memory for storing a series of capsules registered with the system. Moreover, a client port table, a server port table, and a server port queue table for storing these respective data structures are created at start-up. In addition, a sitemap file optionally may be loaded at run-time in step 507. The sitemap file contains the site ID for a given sitename. Thus, the sitemap file maps human readable sitenames corresponding to the internally used UURIDs. The sitemap file may also contain the name of the appropriate transport agent to be used to reach a specific site and what parameters must be used. A known transport agent, such as User Datagram Protocol ("UDP") may be used.

Prior to making any OCL calls, a capsule must register with the OCL in step 510. Capsules must register prior to creating or using resources. Thus, the client-side application would register its capsule by calling an OCL function. The application provides a capsule name as a parameter to the OCL function. The capsule is registered by initializing an area of memory and creating a capsule resource data structure. The OCL makes an entry in the capsule table to track the registered capsule.

In step 515, the client application creates a client port resource. When a client port is created, a entry in the client port table is allocated for the client port. In addition, a call data structure is created and associated with the client port in step 519. The call structure and the client port contain references to each other for the life of the client port in step 521. As stated above, each client port may be associated with only one call structure. The system then returns a client port handle to the caller for later use.

Next, the caller obtains the site ID for the site of the OCA with which the calling process has registered. The site ID is obtained by referencing the sitemap file loaded at step 507. Once the site ID has been provided, the client composes a site NOR (SNOR) for identifying the server port. The site NOR is composed by providing the site ID obtained in step 525, the known manufacturer ID, and a new object ID. Once the SNOR has been composed, the SNOR is set on the client port in step 530. A client application sets the client port SNOR by modifying the SNOR attribute of the client port. The application provides the handle received in step 515 to the OCL who, in turn, alters the SNOR attribute of the client port. All calls will now go to the server port identified by the SNOR.

Next, the signal tag attribute of the client port is set by the client application in step 535. The signal tag attribute is set in the same manner as the SNOR attribute. Specifically, the client application calls an OCL function with the client port handle as a parameter. The function modifies the signal port attribute of the client port. The signal tag may be retrieved when the client port is signaled by the server port at the completion of an asynchronous object call.

The client application initiates the object call in step 540. Two types of calls may be performed. A "block waiting" call is a synchronous call where the client application blocks other activity and waits for the call to complete. A "no-waiting" call is an asynchronous call performed by the client application. In the no-waiting scenario, in stp 555, the client application may continue to do other work without waiting for the call to complete. The client calls an OCL function and provides the client port handle received in step 515, the address of the data to be used in the call, the number of bytes to transfer as call data, and the maximum number of bytes which may be transferred back to the client as response data. In response, the OCL transmits the call to the server. The call may be made to a server application residing at the same site as the client application (an "intra-site" call) or the call may be transmitted to another site via a transport agent specified in the sitemap file. The call is then transported to the server port and queued onto the server port or server queue data structure.

If the call is a no-wait call, the client application may perform some other task before getting a response from the server. Once this separate task is complete, the client application must call another OCL function to wait for a response in the capsule. The client provides the client port handle, the signal tag address, and a wait time. The OCL function then enters a wait mode and queries the signal tag address until a response is received. After a response has been received, the client application may destroy the client port and free the resources associated with the port. Alternatively, the client port may be used again to make another call to the same server.

Figure 8A:
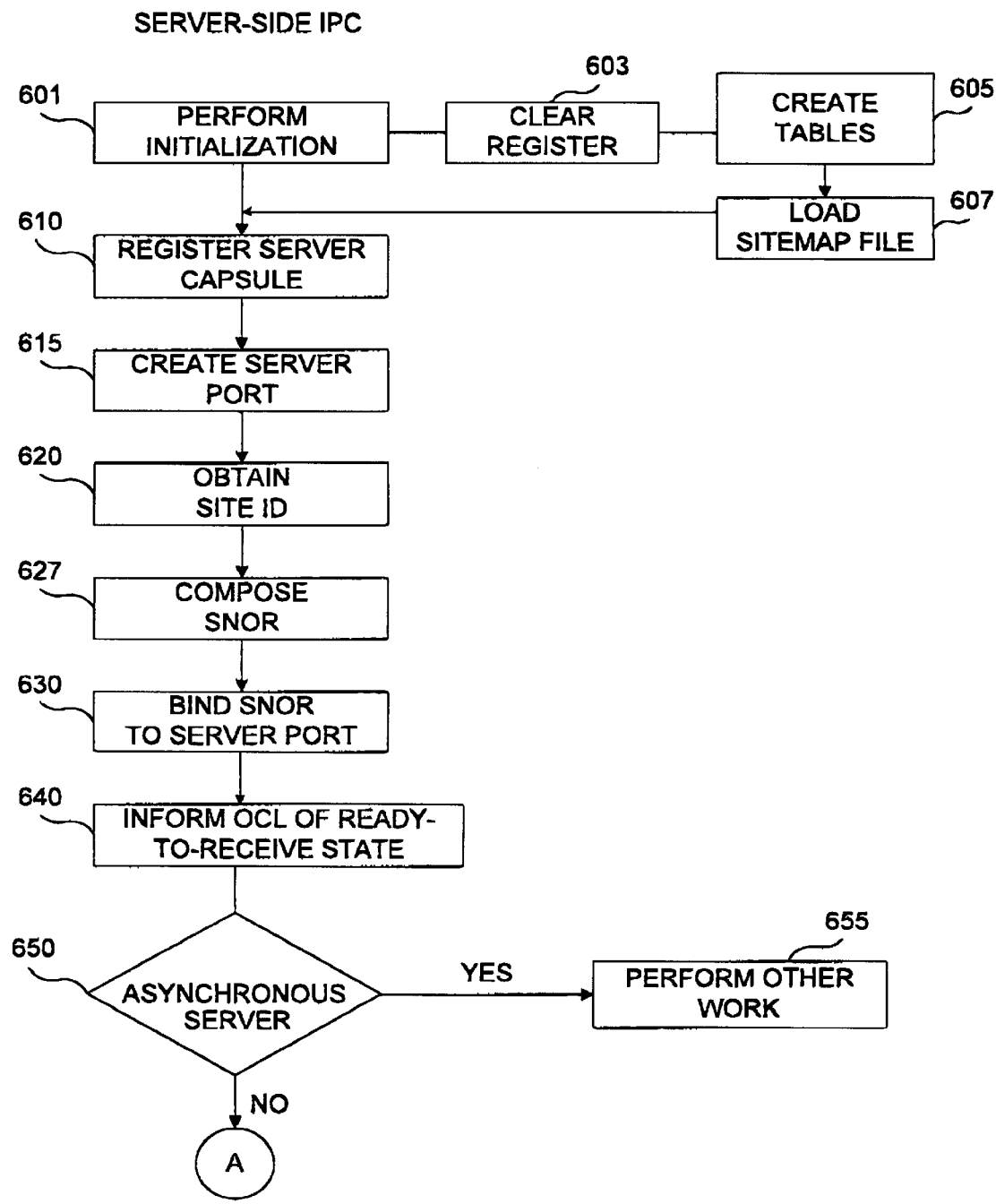
FIGS. 8A–8B are flow charts illustrating the server side of a cross-domain object call.

FIG. 8 illustrates the server-side of IPC using OCL functionality. More specifically, the steps illustrated in FIG. 8 are function calls from a server application residing at the same site as the capsule or at a different site on the network. As with the client, these functions are called from a user mode application, but performed in the kernel mode of the operating system. The server application, in steps 601–607, must perform the same initialization procedures that were performed by the client application. Thus, the OCL must be loaded on the server system as a kernel mode resource, such as a character device driver. Moreover, memory must be allocated for the capsule table and resource data structures. Once the initialization is completed, the server application may execute.

In step 610, the server application must register its capsule with the OCA. The server application provides a capsule name to the OCL register function. This process is identical to the client scenario, where an index in the capsule table is allocated to identify the registered capsule. Following capsule registration, the server application may prepare a server port for data receipt.

In step 615, a server port resource is created. The OCL creates a server port table for the capsule and allocates an entry in the table to specify the server port. If additional server ports are created within this capsule, additional entries in the table will be allocated. The server port is created by creating a server port data structure in the kernel derived from the abstract resource data type. The OCL function returns a server port handle to the caller. The server port handle may be used by the client application to specify the server port and to set and read server port attributes.

The server port, like the client port, must obtain the site ID of the local site prior to accepting calls. Accordingly, the server port, in step 620, queries the OCA for the local site ID. The OCA returns the site ID of the local site. The server application then composes a site NOR (SNOR) to identify the server port. The SNOR contains the site ID, a manufacturer ID, and an object ID, all specified by the server application. The server then calls an OCL function, in step 637 to compose the SNOR using the specified attributes. Once the SNOR has been composed, the server must bind the SNOR to the server port to make it accessible to clients in step 640. The server provides the server port handle and the SNOR to an OCL function. The function binds the SNOR by modifying the NOR attribute for the server port. A resource name table, stored in memory, is used to track NOR bindings and resolution.

When the server is ready to accept a call, the server must call an OCL function for receiving calls. The OCL function sets a ready-to-receive bit on the server port. In addition, the function checks for calls already queued on the server port. If a call is queued on the server port, the server port is signaled. If no calls are queued and the server is asynchronous, the function simply returns. If no calls are queued, and the server is synchronous, the server cannot perform other actions until a call is queued onto the server port.

In the asynchronous case, the server application may go off and perform other actions before checking on queued calls. Once the server is ready to act on a queued call, however, the server application must call an OCL function to wait for a call. The server provides a predetermined wait time to the function. The OCL function then waits until the resource is signaled or until the timer pops. At either event, the function returns. If the resource is not signaled (i.e., the timer has popped), the server may call the function again at a later point. Once the server port has been signaled by a call, the server may obtain information about the call. Specifically, the server application may query the signal port information attribute for the server port. As stated above, the signal port information attribute The attribute contains the number of bytes in the call and the maximum number of bytes with which the server may respond. The maximum number of response bytes was specified by the client in step 640.

Figure 8B:
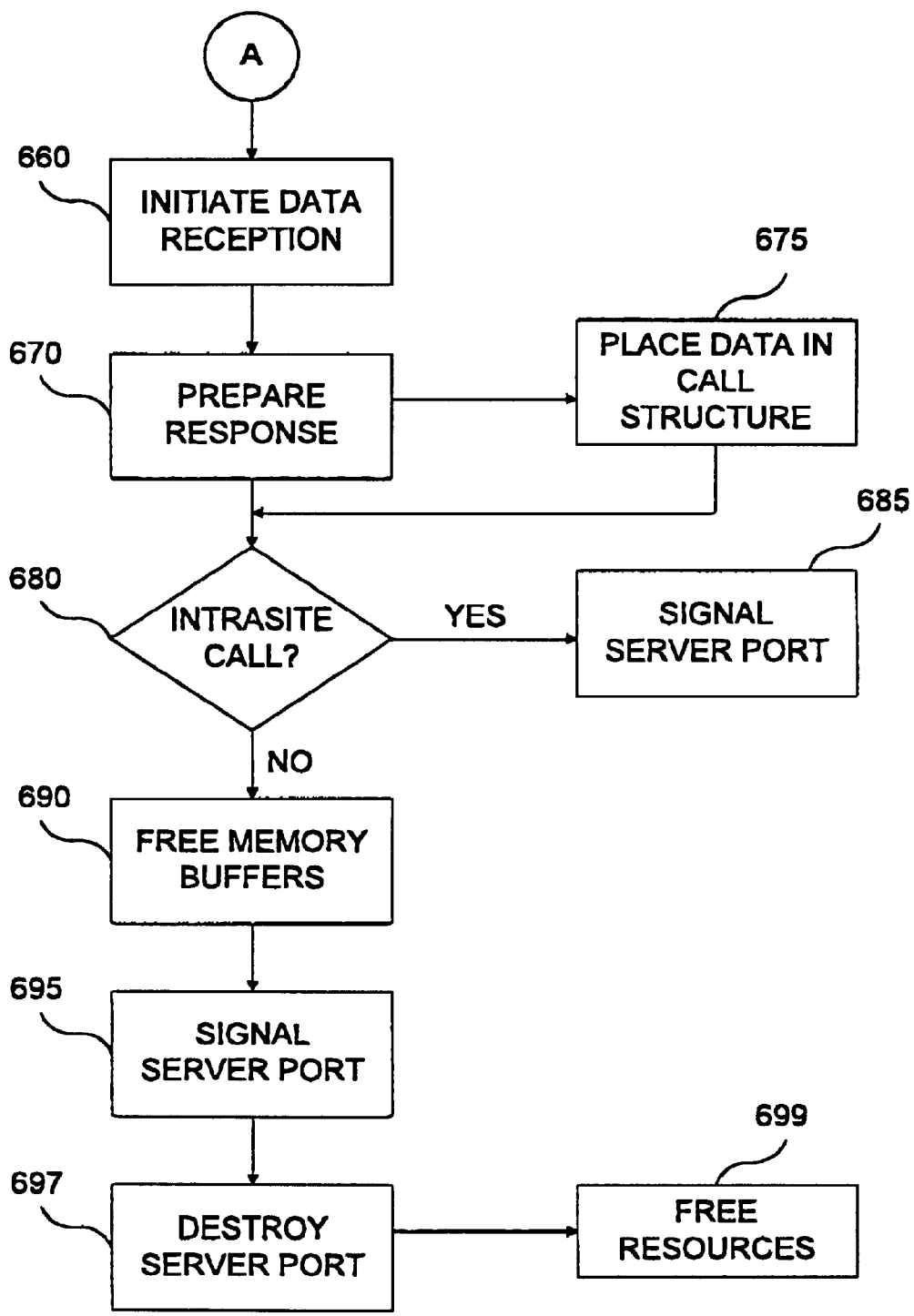

Next, as shown in FIG. 8B, the server initiates data reception from the call in step 6609. The server specifies the server port handle and the temporary address of an area in memory for holding the call data. The data from the call is then placed in the temporary memory address in step 675. The server may then access the call data to perform the specified service. If a response is required, the server will place the data for the response in a second temporary memory address.

To initiate the response, the server must call an OCL function and designate the server port handle, response data and the number of bytes in the response data as parameters. The OCL function checks the number of bytes and verifies that the response size does not exceed the size expected by the caller. The call parameters are then placed onto the call for response. It delivers an intrasite response directly or sends an intersite response. If the call is an intrasite call, the server port is signaled in step 685. If the call is an intersite case, the server port is signaled when the call's memory buffers are no longer necessary to process the response in step 690 and 695.

Finally, the server application destroys the server port in step 697. The OCL frees any resources associated with the port. If the server port is attached to a server port queue, the server port is detached. All of the server port's attributes are reset. Finally, the OCL clears the entry in the server port table.

Figure 9:
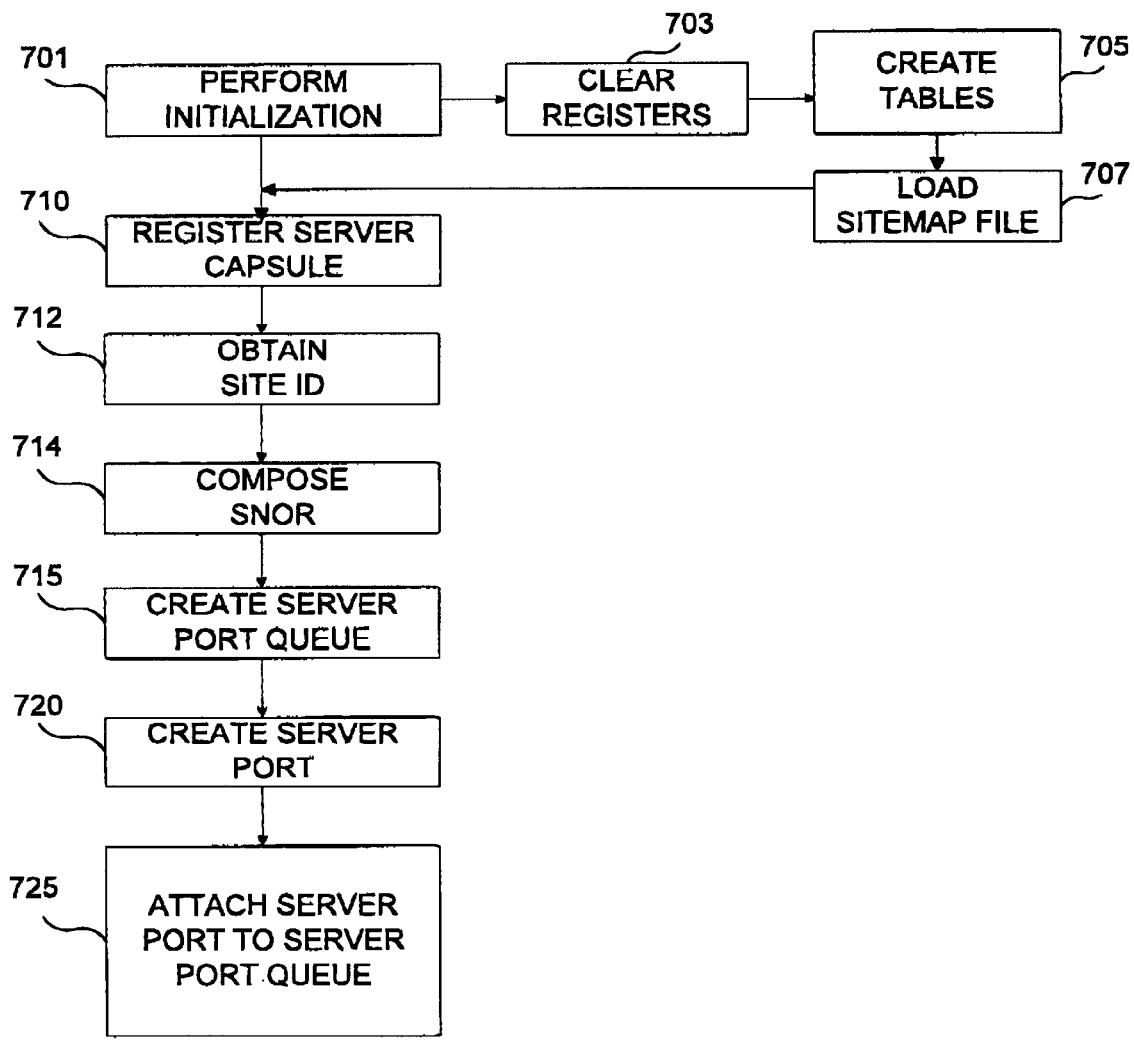
FIG. 9 is a flow chart illustrating the server-side of a cross-domain object call using server port queues.

FIG. 9 is a flow chart illustrating the use of a server port queue. Many of the steps performed are similar to the server port example, illustrated in FIGS. 8A–8B. Thus, the server application registers a capsule with the OCA in step 710 and obtains a site ID for the local site in step 712. The NOR composition is also similar to the server case.

In step 715 a server port queue resource is created. The server port queue resource is derived from the resource abstract data type. The server application creates the server port queue by calling a create function and specifying the NOR to be set on the server port queue. In addition, the server may specify that an existing server port queue with the specified NOR may be reused and/or that if no server port queue with the specified NOR exists, one may be created. The function creates the data structure and sets bits on the data structure in accordance with the specified parameters. The function returns a handle to the server port queue.

The server must then create a server port for attaching to the server port queue IN STEP 720. The server port is created as described above with respect to FIG. 8A. The server port is attached to the queue by calling an attach function and providing the server port handle and the server port queue handle. The attach function first ensures that the server port is not currently active (i.e., is not receiving a call or transmitting a response). The server port is then attached as part of a linked list of server ports. Once the server port is attached, the server application behaves exactly as described with respect to FIG. 8A.

Certain platforms require additional concurrency protection. On platforms using certain UNIX versions, for example, simultaneous access to a resource may result in crashes. To prevent crashes and other related concurrency problems, locks may be used. A lock is a token provided to a user that prevents simultaneous access to a resource.

Several types of locks may be used, including but not limited to the following: (1) a resource table lock; (2) a resource name table lock; (3) a capsule lock; and (4) a delivery lock. For each resource table created (e.g., server port table, client port table), one lock may exist. The resource table lock is designed to protect resource creation and destruction. Thus, when a resource is created, only one user may access that lock. Similarly, there may be one lock per resource name table. The name table lock is used to protect NOR binding and resolution. A capsule lock may be used for purposes of synchronization. The delivery lock protects all data structures related to call delivery. One global delivery lock should be used.

In a second preferred embodiment of the method and apparatus of the present invention, additional functionality is provided for interprocess communication containing large streams of data, such as media data. When a client sends a message to a server requesting a data stream (e.g., a video file), a classical "response" from the server would not be appropriate. Rather, the client expects the data stream as the next message from the server. Accordingly, additional OCL functionality is provided for implementing a send operation on the client side and a receive operation on the server side. The functionality provided by these additional functions are preferably performed with the kernel mode of the operating system.

The client accesses the kernel mode of the client computer, as described above. In the kernel mode, the client creates a client media port data structure derived from the abstract resource data type. The client sits in a loop executing a media port send operation. The message is in the form of a datagram (an unreliable communication) and contains only a port identifier. On the server side, the server sits in a loop executing receive operations. Both the client and server remain in the loop until the data has been completely streamed. To facilitate the transfer and receipt of media data, the server port data structure may include additional fields for media data, pointers to media buffers, and values for holding the number of received media bytes.

Having thus described several preferred embodiments of a method and apparatus for performing kernel-mode fast IPC, it should be apparent to those skilled in the art that certain advantages of the system have been achieved. It should also be appreciated that various modifications, adaptations, and alternative embodiments thereof may be made within the scope and spirit of the present invention. The invention is further defined by the following claims and equivalents:

We claim:

1. A method for performing an interprocess object call between a client process residing in a memory of a client computer and a server process residing in a memory of a server computer, the method comprising the steps of:

accessing a kernel mode of a client operating system of a first type residing in the client computer memory;

creating a resource within the kernel mode of the client operating system of the first type;

creating a client port derived from the resource;

creating a call referenced by the client port; and sending the call to the server computer;

accessing a kernel mode of a server operating system of a second type residing in the server computer memory, wherein the first type is different from the second type;

creating a resource within the kernel mode of the server operating system of the second type;

creating a server port derived from the resource;

receiving data stored in the call using the server port.

2. A method for performing an interprocess object call between a client process residing in a memory of a client computer and a server process residing in a memory of a server computer, the method comprising the steps of:

accessing a kernel mode of a client operating system of a first type residing in the client computer memory;

creating a resource within the kernel mode;

creating a client port derived from the resource;

creating a datagram message requesting data, the datagram message including a site identifier;

sending the datagram to the server computer;

accessing a kernel mode of a server operating system of a second type residing in the server computer memory;

creating a resource within the kernel mode;

creating a server port derived from the resource; and sending the requested data to the client based upon the site identifier.

3. The method for performing an interprocess object call, as recited in claim 1, further comprising the steps of:

accessing a kernel mode of a server operating system of a second type residing in the server computer memory;

creating a resource within the kernel mode of the server operating system of the second type;

creating a server port queue derived from a data structure of the resource;

creating at least one server port derived from the resource;

attaching the at least one server port to the server port queue; and receiving data stored in the call using the at least one server port.

4. The method for performing an interprocess object call, as recited in claim 1, wherein the step of accessing the kernel mode of the client operating system of the first type further comprises the step of translating user mode functions into kernel mode functions.

5. The method for performing an interprocess object call, as recited in claim 4, wherein the step of translating user mode functions into kernel mode functions is performed by a device driver.

6. The method for performing an interprocess object call, as recited in claim 1, further comprising the steps of:

storing a capsule table in the client memory for holding a list of client capsules;

storing a resource table in the client memory for holding a list of client ports.

7. The method for performing an interprocess object call, as recited in claim 6, further comprising the steps of:

storing a capsule table in the server memory for holding a list of server capsules; and storing a resource table in the server memory for holding a list of server ports.

8. The method for performing an interprocess object call, as recited in claim 3, further comprising the step of responding to the client process.

9. An apparatus for performing an interprocess object call between a client process residing in a memory of a client computer and a server process residing in a memory of a server computer, the apparatus comprising:

means for accessing a kernel mode of a client operating system of a first type residing in the client computer memory;

means for creating a resource within the kernel mode;

means for creating a client port derived from the resource;

means for creating a call referenced by the client port;

means for sending the call to the server computer;

means for accessing a kernel mode of a server operating system of a second type residing in the server computer memory;

means for creating a resource within the kernel mode of the server operating system;

means for creating a server port derived from the resource; and means for receiving data stored in the call using the server port.

10. A computer readable medium having embodied thereon instructions which when executed, cause at least one computer to perform interprocess object calls between processes of heterogeneous operating systems, the interprocess object calls comprising:

causing the client computer to access a kernel mode of a client operating system of a first type residing in the client computer;

causing the client computer to create a resource within the kernel mode;

causing the client computer to create a client port derived from the resource;

causing the client computer to create a cal referenced by the client port; and causing the client computer to send the call to the server computer.

11. The computer program product, as recited in claim 10, further comprising:

causing the client computer to access a kernel mode of a server operating system of a second type residing in the server computer memory;

causing the client computer to create a resource within the kernel mode of the server operating system of the second type;

causing the client computer to create a server port derived from the resource; and causing the client computer to receive data stored in the call using the server port.

* * * * *